June 6, 1961   M. MATTERA   2,987,340
LIFTING AND TRANSPORTING APPARATUS AND THE LIKE
Filed April 2, 1958   2 Sheets-Sheet 1

INVENTOR.
Mario Mattera
BY Edwin Leinohn &
Harry Cohen
ATTORNEYS

June 6, 1961 M. MATTERA 2,987,340
LIFTING AND TRANSPORTING APPARATUS AND THE LIKE
Filed April 2, 1958 2 Sheets-Sheet 2
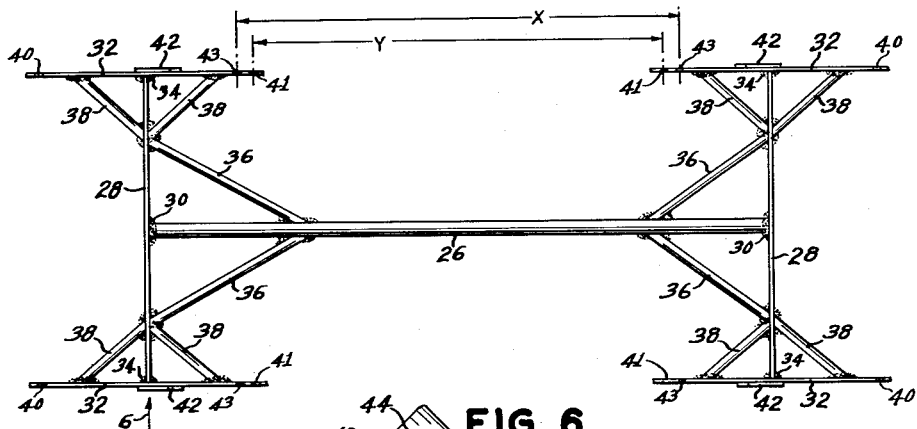
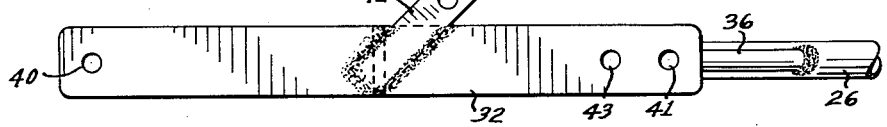
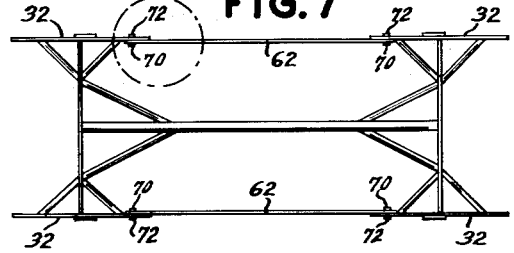
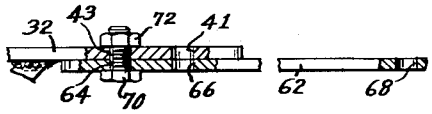
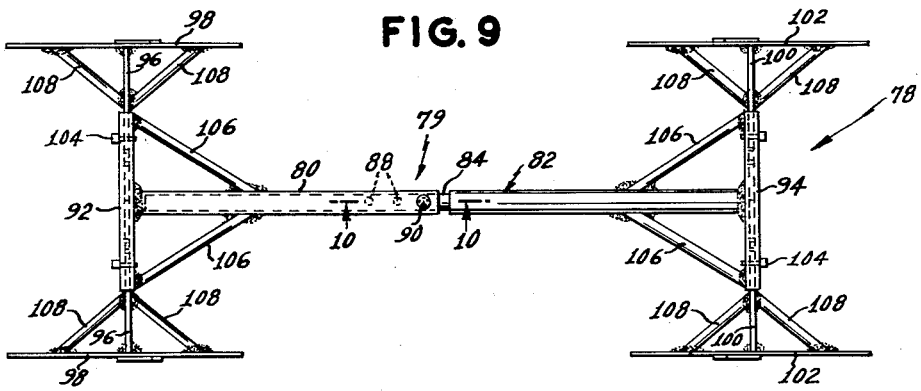
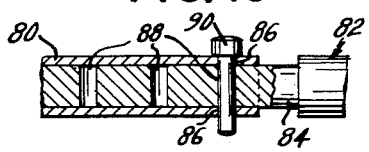
INVENTOR.
Mario Mattera
BY
ATTORNEYS United States Patent Office 2,987,340
Patented June 6, 1961

2,987,340
LIFTING AND TRANSPORTING APPARATUS AND
THE LIKE
Mario Mattera, 2160 W. 12th St., Brooklyn, N.Y.
Filed Apr. 2, 1958, Ser. No. 725,883
6 Claims. (Cl. 294—67)

The present invention relates to apparatus for lifting and transporting loads, and is particularly directed to spreaders for loading or unloading motor vehicles on to or off a ship, from or to an adjacent dock.

It has heretofore been the practice in such loading and unloading operations to provide a spreader which is adapted to lift and transport only one vehicle at the time, thus making said loading and unloading operations relatively time consuming.

It is therefore an object of the present invention to provide a spreader which is adapted to lift and transport a plurality of vehicles simultaneously and which remains balanced throughout its operation.

Another object is the provision of a spreader which is adapted to selectively lift and transport a single small size vehicle, a larger vehicle, or a pair of small size vehicles.

Another object is the provision of a spreader adapted to lift and transport a pair of vehicles which may easily be modified to permit an additional vehicle to be transported thereby.

A further object is the provision of a spreader for lifting and transporting a plurality of vehicles simultaneously which may be adjusted in size so as to enable the spreader to handle a plurality of vehicles of varying size.

A further object is the provision of a spreader having improved means mounted thereon for the support thereof whereby to avoid a twisting moment between the mounting means and the spreader.

A still further object is the provision of a generally improved, simplified, and highly efficient apparatus for lifting and transporting loads.

The above and other objects, features and advantages of the present invention will be more fully understood from the following description considered in connection with the accompanying illustrative drawings.

In the drawings:

FIG. 5 is a plan view, on an enlarged scale, of the spreader of FIG. 1;

FIG. 6 is a partial elevation view, on an enlarged scale, looking in the direction of arrow 6 of FIG. 5;

FIG. 7 is a plan view of the spreader illustrated in FIG. 4;

FIG. 8 is an enlarged view of the encircled area in FIG. 7, partly in section;

FIG. 9 is a plan view of another embodiment of a spreader according to the invention; and FIG. 10 is an enlarged sectional view taken along line 10—10 of FIG. 9.

Figure 1:
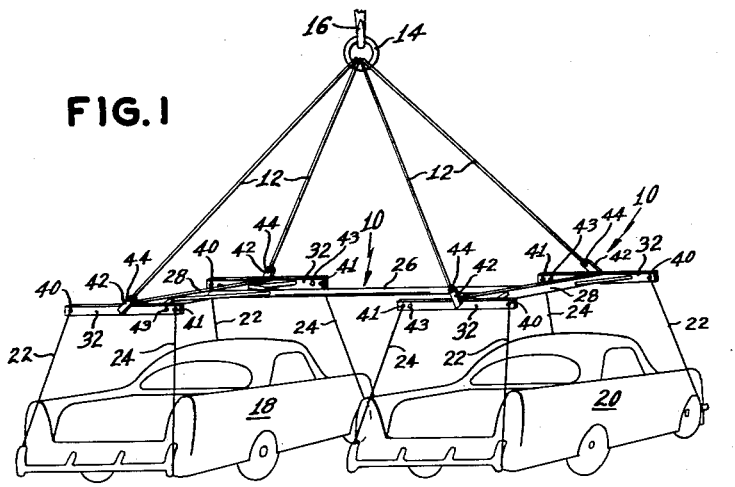
FIG. 1 is a perspective view of a spreader pursuant to the invention and illustrating one mode of operation thereof.

Referring now to the drawings, and particularly to FIGURE 1, there is shown a preferred embodiment of a spreader 10 according to the invention. Spreader 10 is suspended by four cables 12 which are connected at their upper ends to a common ring 14 in which there is engaged a hook 16 which carries the entire load. The spreader 10, as illustrated, supports two automotive vehicles 18 and 20 by means of slings 22 and 24, whereby said vehicles may be hoisted on to or off a ship, for example, from or to an adjacent dock.

The spreader 10, as best seen in FIGURES 5 and 6, comprises a longitudinally extending frame member 26, which may be tubular, and is provided at each end thereof with a cross member 28 which extends transversely of main support member 26 and is welded thereto as shown at 30. Each cross member 28 is provided at the ends thereof with a pair of spaced confronting spreader bars 32 which extend transversely thereof and are welded thereto as shown at 34. The spreader bars 32 are all of the same length and the distance between the coplanar spreader bars at each side of the frame member is greater than the spreader bar length. Reinforcing members 36 and 38 connect the cross members 28 to main support member 26 and to the adjacent spreader bar 32, respectively, for giving additional strength to the lifting structure.

Each spreader bar 32 is provided with apertures 40 and 41 adjacent the outer and inner end respectively, thereof, for insertion therethrough of slings 22 and 24, respectively, and with an aperture 43 disposed a short distance inwardly of aperture 41, for purposes to be hereinafter described. A lifting lug 42 is welded onto each spreader bar 32 at the outer surface thereof, and is inclined upwardly and inwardly thus forming an angle with the longitudinal axis of the associated spreader bar. Each lifting lug is provided with an aperture 44 adjacent the upper end thereof for insertion therethrough of cables 12 which converge upwardly to ring 14 to which they are secured. As best seen in FIGURE 1, the angular disposition of each lifting lug 42 is such as to make the axis thereof substantially coincide with the direction of stress transmitted by the associated cable 12 whereby to prevent a relative twisting moment between the lug and the spreader bar and thereby strengthen the welded connection therebetween.

It will be seen that the spreader 10, as described above, is symmetrically arranged about both the longitudinal and transverse axis thereof and is accordingly perfectly balanced. As shown in FIGURE 1, the spreader 10 is adapted to lift two vehicles 18 and 20, of the small European type, each pair of confronting spreader bars 32 supporting one vehicle with the slings 22 and 24 depending from apertures 40 and 41, respectively, of one spreader bar of each pair being attached to the front part of the associated vehicle and the slings 22 and 24 depending from apertures 40 and 41, respectively, of the other spreader bar of each pair being attached to the rear part of said vehicle. As seen in FIGURE 1, the length of the slings 22 and 24 is sufficiently short to permit the spreader 10 to lift the two vehicles 18 and 20, with substantially little or no lateral movement of said vehicles while they are being transported. Also, since the spreader is symmetrical and perfectly balanced and the two vehicles are substantially identical in size and weight, the spreader 10 will remain substantially horizontal during the entire lifting operation.

Figure 2:
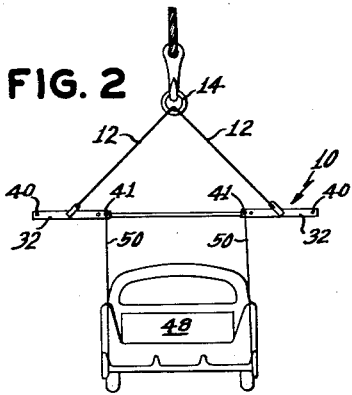
FIG. 2 is an elevation view thereof, on a reduced scale, and illustrating another mode of operation thereof.

Referring now to FIGURE 2, the spreader 10 is shown adapted to lift a single small sized vehicle 48. In this connection a sling 50 is inserted only through the inner aperture 41 of each spreader bar 32 and is provided at its lower end with conventional means for attachment to the vehicle therebelow. Due to the symmetrical arrangement of the spreader 10, as previously described, it will remain substantially horizontal during the entire transporting and lifting operation of the single small sized vehicle 48.

Figure 3:
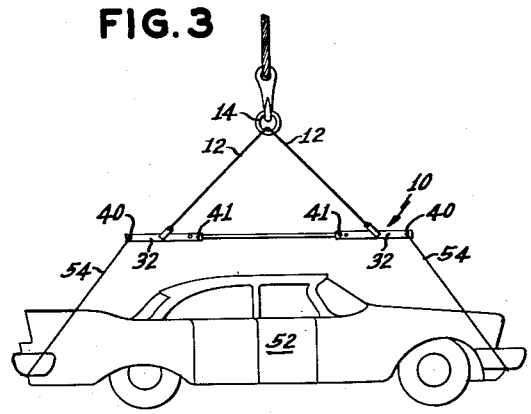
FIG. 3 is an elevation view thereof, on a reduced scale, and illustrating yet another mode of operation thereof.

In FIGURE 3, there is shown the spreader 10 adapted to lift and transport a single large sized vehicle 52. A sling 54 is inserted only through the outer aperture 40 of each spreader bar 32 and is provided at its lower end with conventional means for attachment to the vehicle therebelow. In this manner a single large sized vehicle may conveniently be lifted and transported by the spreader 10 in a perfectly balanced manner.

Figure 4:
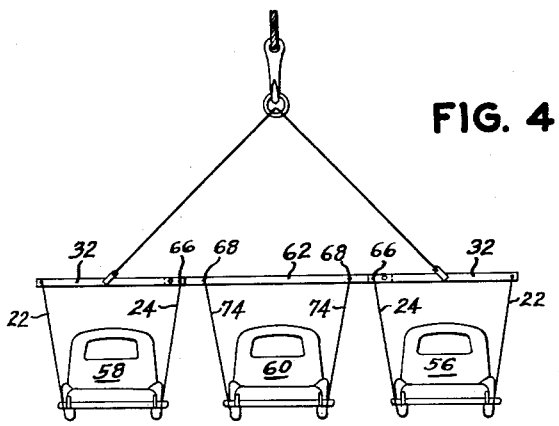
FIG. 4 is an elevation view of a modification of the spreader of FIG. 1 on a reduced scale, illustrating the operation thereof.

According to another aspect of the present invention the aforedescribed spreader 10 is adaptable to lift and transport three small sized vehicles 56, 58 and 60, as illustrated in FIGURE 4. Toward that end there is provided an intermediate spreader bar 62, between the two coplanar spreader bars 32 at each side of the main frame member 26 (FIGS. 7 and 8). Each intermediate spreader bar 62 is provided with an aperture 64 adjacent each end thereof, an aperture 66 disposed inwardly of each aperture 64, and an aperture 68 disposed inwardly of each aperture 66. The spacing between the apertures 68 in the intermediate spreader bar 62 is equal to the distance between apertures 40 and 41 in each spreader bar 32. The spacing between the apertures 64 in intermediate spreader bar 62 is equal to the spacing between the apertures 43 on the coplanar spreader bars 32 as indicated by the distance X in FIGURE 5, and the spacing between apertures 66 in intermediate spreader bar 62 is equal to the spacing between apertures 41 in coplanar spreader bars 32 as indicated by the distance Y in FIGURE 5. Accordingly, intermediate spreader bar 62 is easily securable to the spreader 10 by aligning apertures 64 thereof with apertures 43 and providing a stud 70 extending through said aligned apertures and tightening a nut 72 as shown in FIGURE 8. When so mounted, apertures 66 will be aligned with apertures 41 so that slings 24 may be inserted therethrough in the same manner and for the same purpose as previously described in connection with FIGURE 1. Slings 74 may now be inserted through apertures 68 of the intermediate spreader bars 62 and said slings 74 are provided at their lower ends with conventional means for attachment to vehicle 60, as shown in FIGURE 4. It will be understood that slings 74 as well as slings 22 and 24 are sufficiently short so as to prevent any significant lateral movement of the vehicles supported thereby when spreader 10 is lifted. It is thus seen that the spreader according to the invention may conveniently be adapted for lifting three small sized vehicles, the spreader being symmetrically arranged and the vehicles being symmetrically mounted so as to enable the loaded spreader to be lifted and transported while it remains substantially horizontal.

According to another embodiment of the present invention there is provided a spreader 78 which is adjustable in size so as to make it adaptable for lifting and transporting a plurality of vehicles of varying sizes. With reference to FIGURE 9 the spreader 78 is seen to comprise a longitudinal frame member 79 which is made up of tubular member 80 and a longitudinal member 82 having a reduced diameter end portion 84 adapted to telescopically slide into and out of member 80. As shown in FIGURE 10, tubular member 80 is provided adjacent one end thereof with a pair of diametrically opposed apertures 86 and part 84 of longitudinal member 82 is provided with a plurality of longitudinally spaced through apertures 88. Accordingly, member 82 may be inserted into member 80 so that a selected one of through apertures 88 is aligned with apertures 86, and a stud 90 is inserted through said aligned apertures to releasably secure member 80 to member 82. Tubular member 80 is provided at the other end thereof with a tubular cross member 92 extending transversely thereof, and longitudinal member 82 is likewise provided at the other end thereof with a tubular cross member 94 extending transversely thereof. Cross bars 96 are provided and adapted to telescopically slide into and out of tubular member 92 at the opposite ends thereof respectively. Each bar 96 is provided with a spreader bar 98 at the other end thereof. In the same manner cross bars 100 are provided and are adapted to telescopically slide into and out of tubular member 94 at the opposite ends thereof. Each cross bar 100 is provided with a spreader bar 102 at the other end thereof and conventional means 104 are provided for releasably securing cross bars 96 and 100 to tubular members 92 and 94, respectively, in selected ones of a plurality of positions. Reinforcing members 106 and 108 are provided for giving added strength to the spreader 78. Spreader bars 98 and 102 are in all respects similar to spreader bar 32 previously described in connection with FIGURE 5. It is thus seen that there has been provided a spreader 78 which is adjustable in size. Namely, the overall length thereof is adjustable by the telescopic arrangement of longitudinal member 82 in tubular member 80 and the width is adjustable by the telescopic arrangement of bars 96 and 100 relative to tubular members 92 and 94 respectively. Accordingly the embodiment of FIGURE 9 may be used in exactly the same manner as the embodiment previously described in connection with FIGURES 1 through 8, and may further be varied in its overall dimensions whereby vehicles of various sizes may be lifted and transported thereby.

While I have shown and described the preferred embodiments of my invention, it will be understood that various changes may be made in the idea or principles of the invention within the scope of the appended claims.

Having thus described my invention what I claim and desire to secure by Letters Patent is:

1. Apparatus for loading and unloading a pair of vehicles simultaneously comprising, a longitudinal frame member provided at each end thereof with a cross member extending transversely of said frame member, each of said cross members being secured at its midpoint to the associated end of said frame member, each of said cross members having secured thereto a spreader bar at each end thereof which extends transversely thereof whereby to provide two symmetrically disposed pairs of horizontally extending and parallel spaced confronting spreader bars, each of said pairs having means for supporting a vehicle to be loaded whereby a pair of vehicles may be simultaneously transported by said apparatus.

2. Apparatus for loading and unloading vehicles, comprising, a longitudinal frame member, a pair of confronting horizontally extending and parallel spaced spreader bars secured to said frame member adjacent each end thereof, each of said spreader bars having a first and second aperture adjacent the ends thereof, respectively, for suspending therefrom load carrying slings, said apparatus being selectively adaptable to lift a single small size vehicle by means of slings suspended from the first apertures of said spreader bars, a single large sized vehicle by means of slings suspended from the second apertures of said spreader bars, or a pair of small size vehicles by means of slings suspended from said first and second apertures of said spreader bars.

3. Apparatus for loading and unloading vehicles, comprising, a longitudinal frame member, a pair of confronting horizontally extending and parallel spaced spreader bars secured to said frame member adjacent each end thereof, each of said spreader bars having a first and second aperture adjacent the ends thereof, respectively, for suspending therefrom load carrying slings, said apparatus being selectively adaptable to lift a single small size vehicle by means of slings suspended from the first apertures of said spreader bars, a single large sized vehicle by means of slings suspended from the second apertures of said spreader bars, or a pair of small size vehicles by means of slings suspended from said first and second apertures of said spreader bars, and a lifting lug provided on each of said spreader bars and having an aperture for insertion therethrough of a cable for lifting said apparatus, each of said cables being connected at the upper end thereof to a common lifting means whereby said cables diverge downwardly from said common lifting means to the associated lifting lugs, respectively, and said lifting lugs being disposed at an angle relative to the associated spreader bar corresponding to the inclination of the cable provided therefor whereby to prevent a twisting moment between the lifting lug and the associated spreader bar.

4. Apparatus for loading and unloading a pair of vehicles simultaneously comprising, a longitudinal frame member provided at each end thereof with a cross member extending transversely of said frame member, each of said cross members being secured at its midpoint to the associated end of said frame member, each of said cross members having secured thereto a spreader bar at each end thereof which extends transversely thereof whereby to provide two symmetrically disposed pairs of horizontally extending and parallel spaced confronting spreader bars, each of said pairs having means for supporting a vehicle to be loaded whereby a pair of vehicles may be simultaneously transported by said apparatus, and reinforcing members connecting said frame member to said cross members, and said cross members to said spreader bars, respectively, for giving added strength to said apparatus.

5. Apparatus for loading and unloading a plurality of vehicles having a given length simultaneously comprising, a longitudinal frame member provided at each end thereof with a cross member extending transversely of said frame member, each of said cross members being secured at its midpoint to the associated end of said frame member, each of said cross members having secured thereto at each end thereof a spreader bar which extends transversely of the associated cross member whereby to provide two symmetrically disposed pairs of horizontally extending and parallel spaced confronting spreader bars, there being a spreader bar in each pair at each of the opposite sides of said longitudinal frame member, and the spreader bars at each of said opposite sides being in spaced coplanar relation, and an intermediate spreader bar releasably secured between the coplanar spreader bars at each side, respectively, of said longitudinal frame member whereby to provide an intermediate pair of spaced confronting spreader bars, each of said spreader bars having means for suspending therefrom a plurality of load carrying slings, the spacing between the confronting spreader bars of each pair substantially corresponding to said given length of a vehicle to be loaded whereby the load carrying sling suspended from each pair is adapted to support one such vehicle.

6. Apparatus for loading and unloading a pair of vehicles simultaneously comprising, a longitudinal frame member provided at each end thereof with a cross member extending transversely of said frame member, each of said cross members being secured at its midpoint to the associated end of said frame member, each of said cross members having secured thereto a spreader bar at each end thereof which extends transversely thereof whereby to provide two symmetrically disposed pairs of horizontally extending and parallel spaced confronting spreader bars, each of said pairs having means for supporting a vehicle to be loaded whereby a pair of vehicles may be simultaneously transported by said apparatus, and means releasably securable to said pairs of spreader bars and disposed in the space therebetween for supporting a third vehicle for simultaneous transportation thereof together with said pair of vehicles.

References Cited in the file of this patent

UNITED STATES PATENTS

| | | |
|---|---|---|
| 1,677,695 | Vogt | July 17, 1928 |
| 1,846,038 | Owens | Feb. 23, 1932 |
| 1,855,665 | Campbell et al. | Apr. 26, 1932 |
| 1,970,617 | Morgan | Aug. 21, 1934 |
| 2,010,054 | Brotz et al. | Aug. 6, 1935 |
| 2,020,174 | Derossi | Nov. 5, 1935 |
| 2,284,238 | Todd | May 26, 1942 |
| 2,307,737 | Courtney | Jan. 12, 1943 |
| 2,625,424 | Hyman | Jan. 13, 1953 |
| 2,818,296 | Brennan et al. | Dec. 31, 1957 |